G. J. KARRO.
ALARM.
APPLICATION FILED NOV. 21, 1919.
1,332,180.
Patented Feb. 24, 1920.
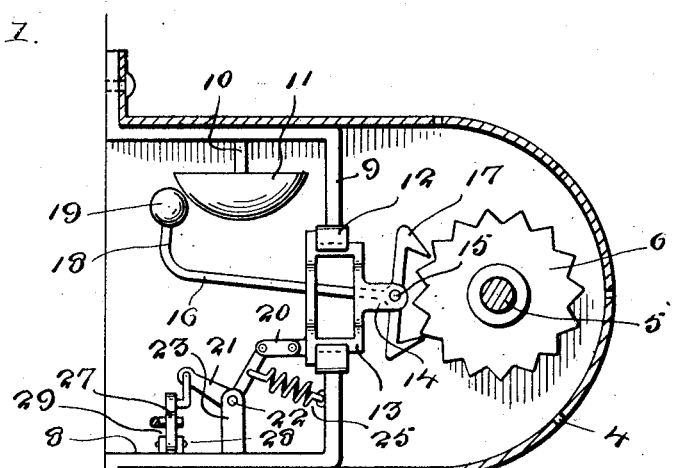
Fig. 1.
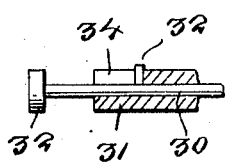
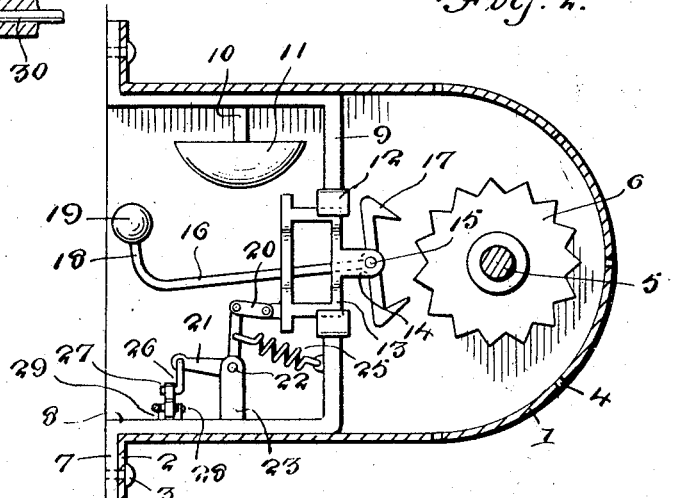
Fig. 2.
Fig. 3.
WITNESS:
E. R. Ruppert.
Gustave J. Karro
INVENTOR.
BY
Victor J. Evans
ATTORNEY.

UNITED STATES PATENT OFFICE.

GUSTAVE J. KARRO, OF NEW YORK, N. Y.

ALARM.

1,332,180.   Specification of Letters Patent.   Patented Feb. 24, 1920.

Application filed November 21, 1919. Serial No. 339,632.

*To all whom it may concern:*

Be it known that I, GUSTAVE J. KARRO, a citizen of the United States, residing at New York, in the county of New York and State of New York, have invented new and useful Improvements in Alarms, of which the following is a specification.

This invention has reference to alarms.

The improvement is primarily devised for use in connection with an automobile, and has for its object to provide simple means whereby means may be brought into engagement with an element on a revolving part of the machine to cause the sounding of an alarm.

It is a further object of the invention to provide, in combination with a revolving part of the engine or magneto of an automobile, an alarm, including a slidable frame spring influenced in the direction of the shaft carrying means designed to coöperate with the shaft for oscillating the element to cause the same to contact with a sound producer, and to also provide means for moving the frame in an opposite direction to bring the oscillatory member out of engagement with the shaft when the alarm is not to be sounded.

A still further object of the invention is to produce a bell alarm for automobiles or the like which shall be of a simple construction, comparatively cheap to manufacture, easily installed and thoroughly efficient in operation.

The foregoing objects and others which will appear as the nature of the invention is better understood may be accomplished by a construction, combination and operative arrangement of parts such as disclosed by the accompanying drawings.

In the drawings:—

Figure 1 is a side elevation with the casing and other parts in section, of the improvement, the device being shown in operative position.

Fig. 2 is a similar view but showing the device in its normal inoperative position.

Fig. 3 is a detail sectional longitudinal view through the sleeve for the operating rod, showing the operating rod in its normal position as when the parts are inoperative.

Secured to any desired part of an automobile or the like is a casing 1 having its inner and open end flanged as at 2, and through the said flange securing elements 3 pass. The outer closed end of the casing 1 is substantially rounded and is provided with spaced apertures 4. Through the rounded end of the casing there is passed a revoluble element 5. This element may be in the nature of the engine shaft or the magneto shaft when the device is employed in connection with an automobile. On the shaft 5 there is keyed an escapement wheel 6. The escapement wheel is, of course, arranged within the casing 1.

Secured by the elements 3 to the flange 2 and to the support of the device are the angle ends 7 of longitudinally arranged members 8. The members 8 are oppositely disposed in the casing 1 and have their inner ends extended toward each other as indicated by the numeral 9. On one of the members 8 is a post 10, to which is secured a bell 11.

The portions 9 of the members 8 terminate away from each other and have their ends widened and the confronting faces thereof formed with transverse slots 12 which provide ways for a substantially rectangular slidable frame 13. The frame has outwardly projecting ears 14 through which passes a pivot 15 that secures between the ears and between the side members of the frame, a striker arm 16. On the pivoted end of the striker arm 16 is an escapement lever 17, and on the opposite end of said striker arm, which end is preferably offset as at 18 is a striker head 19 disposed opposite the bell 11.

Pivotally secured to the lower end of the striker 13 is a link 20. Pivotally connected to this link 20 is a bell crank lever 21. This lever 21 is pivoted as at 22 to a support 23 carried by one of the members 8. Between the vertical arm of the bell crank lever 21 and the end line of the lower member 8 is a helical spring 25. This spring is designed to exert a tension between the said member 9 and the said bell crank lever to swing the latter to cause the frame 13 to be moved toward the escapement wheel 6 to bring the escapement lever 17 into engagement with the said lever, and thereby cause the rocking of the striker member 15 and the sounding of the bell 11.

Secured loosely to the horizontal arm of the bell crank lever 21 is the offset end of a link 26. The second offset arm of this link is connected to a bar 27 that is pivotally secured as at 28 between spaced ears 29 carried by the lower member 8. To the bar 27 there is loosely connected the inner end of the operating rod 30. The rod has its outer end projected through a sleeve 31, the said outer end of the rod being headed as at 32. On the rod 30 is an offset finger 33 that is designed to be received in a slot 34 in the sleeve 31 and when in contacting engagement with the inner wall provided by the slot to arrange the parts in operative position as illustrated in Fig. 1. When the parts are to be brought to inoperative position as shown in Fig. 2 the rod 30 is pulled outward of its sleeve and turned so that the finger 32 will contact with the outer end of the sleeve 31. This causes the swinging of the bell crank lever 21 and through this link connection with the frame 13, sliding the said frame and the striker member, swinging the escapement lever 17 away from the escapement wheel 6. In sounding the alarm it is merely necessary for the operator to turn the rod 30 until the finger thereby is brought opposite the slot 34. The rod is then released, and the spring 25 will compress and bring the parts to operative position.

Having thus described the invention, what I claim is:—

In a device for the purpose set forth, the combination with a revoluble member, a casing in which the same is received, an escapement wheel on the member arranged in the casing, a slidable frame in the casing, guide means therefor, a striker arm pivotally secured to the frame, an escapement lever on the pivoted end of the arm, a striker head on the pivoted end of the arm, a bell, a pivoted bell crank lever, a pivoted link between the lever and frame, spring means influencing the lever to slide the frame to bring the escapement lever in engagement with the escapement wheel, and a striker head in the path of contact with the bell, an operating rod, a guide sleeve therefor, a finger on the rod, said sleeve having a notch to receive the finger when the parts are brought in operative position, and connecting means between the rod and the bell crank lever to permit of the turning of the rod when the finger thereof has been brought out of the notch of the sleeve and when the rod has influenced the lever to slide the frame and bring the escapement lever out of engagement with the escapement wheel.

In testimony whereof I affix my signature.

GUSTAVE J. KARRO.